US007796555B2

(12) United States Patent
Jeon et al.

(10) Patent No.: US 7,796,555 B2
(45) Date of Patent: Sep. 14, 2010

(54) METHOD OF COMMUNICATING IN WIRELESS NETWORK

(75) Inventors: Beom Jin Jeon, Seoul (KR); Hyeon Cheol Cho, Seoul (KR); Taek Soo Kim, Seoul (KR)

(73) Assignee: LG Electronics, Inc., Seoul (KR)

( * ) Notice: Subject to any disclaimer, the term of this patent is extended or adjusted under 35 U.S.C. 154(b) by 0 days.

(21) Appl. No.: 12/485,001

(22) Filed: Jun. 15, 2009

(65) Prior Publication Data
US 2009/0257403 A1 Oct. 15, 2009

Related U.S. Application Data

(63) Continuation of application No. 12/373,171, filed as application No. PCT/KR2007/004153 on Aug. 29, 2007.
(60) Provisional application No. 60/824,243, filed on Aug. 31, 2006.

(30) Foreign Application Priority Data

Sep. 25, 2006 (KR) ............... 10-2006-0093158
Sep. 25, 2006 (KR) ............... 10-2006-0093160

(51) Int. Cl.
    H04W 4/00 (2009.01)
(52) U.S. Cl. .................. 370/331; 370/332; 370/338
(58) Field of Classification Search ............ 455/41.2, 455/41.3, 435.1–435.3, 436–444, 450, 452.2, 455/453, 502, 509, 517, 524, 525; 370/328–333, 370/338, 346, 350, 445, 449, 400
See application file for complete search history.

(56) References Cited

U.S. PATENT DOCUMENTS 7,245,947 B2 * 7/2007 Salokannel et al. ......... 455/574

(Continued)

FOREIGN PATENT DOCUMENTS

EP 1487155 12/2004

(Continued)

OTHER PUBLICATIONS

Vasudevan et al., "Leader election algorithms for wireless ad hoc networks", IEEE DISCEX, Apr. 22, 2003.

(Continued)

Primary Examiner—Anthony S. Addy
(74) Attorney, Agent, or Firm—Lee, Hong, Degerman, Kang & Waimey

(57) ABSTRACT

The present invention relates to a handover method that a current coordinator transfers a coordinating function of controlling a network to a different device configuring the network. The present invention relates to a method of selecting an optimal device as a coordinator in selecting the different device using priority information decided by a prescribed evaluation reference. And, the present invention relates to a method of simplifying a procedure in a manner of transmitting relevant information together with a handover request message. In a wireless network including a coordinator, a secondary coordinator is decided in advance. If the coordinator is suddenly unable to perform a function, the present invention relates to a method of enabling the function of the coordinator to be performed by the decided secondary coordinator. Thus, a process for transferring the coordinating function without the handover process is called a recovery process. The present invention relates to the recovery method and a method of deciding a secondary coordinator to perform a recovery. In the method of deciding the secondary coordinator, a method of deciding a more proper coordinator using information on coordinator priority is provided.

13 Claims, 4 Drawing Sheets

U.S. PATENT DOCUMENTS

| | | | |
|---|---|---|---|
| 7,447,178 B2 * | 11/2008 | Kim et al. | 370/331 |
| 7,447,503 B2 * | 11/2008 | Shvodian | 455/435.2 |
| 7,463,886 B2 * | 12/2008 | Salokannel et al. | 455/426.1 |
| 7,606,199 B2 | 10/2009 | Ayyagari et al. | |
| 2004/0170217 A1 | 9/2004 | Ho | |
| 2004/0235489 A1 | 11/2004 | Kwon | |
| 2004/0255001 A1 * | 12/2004 | Oh et al. | 709/209 |
| 2005/0059420 A1 | 3/2005 | Salokannel et al. | |
| 2005/0090264 A1 | 4/2005 | Kim | |
| 2005/0237979 A1 | 10/2005 | Kim et al. | |
| 2006/0242025 A1 | 10/2006 | Nishihara et al. | |
| 2006/0280140 A9 | 12/2006 | Mahany et al. | |
| 2007/0002809 A1 | 1/2007 | Reunamaki et al. | |
| 2007/0025384 A1 * | 2/2007 | Ayyagari et al. | 370/445 |
| 2007/0076614 A1 | 4/2007 | Cho | |
| 2007/0268862 A1 | 11/2007 | Singh et al. | |
| 2007/0270121 A1 | 11/2007 | Shao et al. | |
| 2007/0286140 A1 | 12/2007 | Kwon | |
| 2008/0013519 A1 * | 1/2008 | Kwon et al. | 370/345 |
| 2008/0037465 A1 * | 2/2008 | Ngo et al. | 370/329 |
| 2008/0080425 A1 | 4/2008 | Lee et al. | |
| 2008/0279160 A1 * | 11/2008 | Qin et al. | 370/338 |
| 2009/0067389 A1 | 3/2009 | Lee et al. | |
| 2010/0074097 A1 | 3/2010 | Jeon et al. | |

FOREIGN PATENT DOCUMENTS

| | | |
|---|---|---|
| EP | 1528717 | 5/2005 |
| KR | 10-2005-0100951 | 10/2005 |
| KR | 20-0419292 | 6/2006 |
| KR | 10-0603560 | 7/2006 |
| WO | 0103458 | 1/2001 |

OTHER PUBLICATIONS

Hayes et al., "Wireless LAN Medium Access Control (MAC) and Physical Layer (PH) Specifications", IEEE Std 802.11 Information Technology, ISO/IEC 8802-11, Aug. 2005.

* cited by examiner

METHOD OF COMMUNICATING IN WIRELESS NETWORK

This application is a continuation of U.S. application Ser. No. 12/373,171, filed Oct. 19, 2009, currently pending, which is the National Stage filing under 35 U.S.C. 371 of International Application No. PCT/KR2007/004153, filed on Aug. 29, 2007, which claims the priority of Korean Patent Application No. 10-2006-0093158, filed Sep. 25, 2006, Korean Patent Application No. 10-2006-0093160, filed Sep. 25, 2006, and U.S. provisional application Ser. No. 60/824,243, filed Aug. 31, 2006, the contents of which are hereby incorporated by reference herein in their entirety.

TECHNICAL FIELD

The present invention relates to wireless communication, and more particularly, to a method of performing communication for wireless network handover and implicit handover in wireless network.

BACKGROUND ART

Generally, various devices are peripherally used more often. So, those devices need to be used in a manner of interoperating with each other. Yet, it is inconvenient to connect a plurality of the devices together by wire. Since applications of the respective devices are not mutually compatible, it is substantially difficult to connect the devices together.

If communication is carried out by wireless technology, wires including cable and the like between the devices can be removed. And, it is also possible to directly exchange data information in a manner that the devices configure networks via wireless network between themselves.

Devices capable of performing communication on the network include computers, PDA, notebook computers, digital TV, camcorders, digital cameras, printers, microphones, speakers, headsets, barcode readers, displays, mobile phones, and the like. And, all kinds of digital devices can be used as the devices capable of performing communication on the network.

In order to perform communication via the wireless network, a device capable of performing a control function of controlling and distributing resource allocation between devices configuring the network is needed.

If the device is unable to perform the control function as a coordinator, a process for enabling the control function to be performed by another device corresponding to one of the devices configuring the network is needed.

Even if a new device having conditions better than those of a current coordinator in performing the control function is associated in the network, a process for transferring the control function to the new device is needed as well.

Besides, when the process for transferring the control function is not performed, it may happen that power supply to the coordinator is suddenly interrupted or that the coordinator moves away to deviate from a distance range for establishing the network.

However, under the above circumstances, if a device capable of continuing the control function fails to exist, it is unable to make a response to resource allocation request from the devices in the course of communication on the network. And, it is unable to perform a timing control.

Accordingly, the devices performing the communication via the network are unable to perform data transmissions and receptions. And, a problem of failing to maintain the network takes place.

DISCLOSURE OF INVENTION

Technical Problem

Accordingly, the present invention is directed to a method of communicating in wireless network that substantially obviates one or more of the problems due to limitations and disadvantages of the related art.

An object of the present invention is to provide a method of maintaining a control function continuously, by which wireless communication can be smoothly carried out for the related art.

Another object of the present invention is to provide a method of maintaining a network coordinating function continuously, by which wireless communication can be smoothly carried out for the related art.

Technical Solution

A device attempting to perform communication on a wireless network searches channels on a band for performing communication and checks a presence or non-presence of a previously established network and the like.

And, the device is associated in a previously established network and then performs communication.

Moreover, the device can configure a new network by itself. In configuring a new network, the device configures the new network in a manner of selecting a channel having a good channel environment based on information acquired from the above search and check processes and then broadcasting control information packets via the selected channel.

Even if a network including a control device is established, it may happen that the control device is unable to perform a control function due to user's necessity or environmental situations. If so, smooth communication of the network can be secured by a process for transferring the control function to another device.

In case that a device more suitable to perform the control function than a current control device is associated in a network, it is preferable that the control function is transferred to the newly associated device for smoother communication.

Thus, after a network has been established, a control device transfers a control function to another device. This is called a handover. A handover method according to one embodiment of the present invention is provided. In particular, a method of deciding a device for making a request for the handover according to a priority for a prescribed control function is provided.

According to another embodiment of the present invention, in case that a device for controlling communication resources of each device in a wireless network system terminates its function without performing a process for handing over the control function, a method of continuing communication by recovering the control function is disclosed. In case that the control function is suddenly terminated, the control function in the network is maintained and recovered according to the present embodiment. This can be named a recovery or an implicit handover.

Besides, a preliminary handover process can be executed prior to execution of a handover or recovery operation. The preliminary handover process means a process that a current coordinator transmits handover relevant information and/or coordinator relevant information to a device as a handover target and that the corresponding device stores the received handover relevant information and/or the received coordinator relevant information.

Advantageous Effects

According to one embodiment the present invention, communication can be smoothly carried out on a wireless network. In particular, communication can be seamlessly carried out without being considerably affected by a situation of a specific device.

And, a device capable of performing a coordinating function can be flexibly changed according to a situation instead of being specified to a specific device.

Moreover, a new coordinator is selected by considering a priority for a coordinating function to enable an optimal device to operate as the new coordinator.

According to another embodiment the present invention, communication can be smoothly carried out on a wireless network. In particular, communication can be seamlessly carried out without being considerably affected by a situation of a specific device.

And, a more suitable device can be selected in case of deciding a substitute coordinator, whereby efficient communication is enabled.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

BEST MODE FOR CARRYING OUT THE INVENTION

Figure 1:
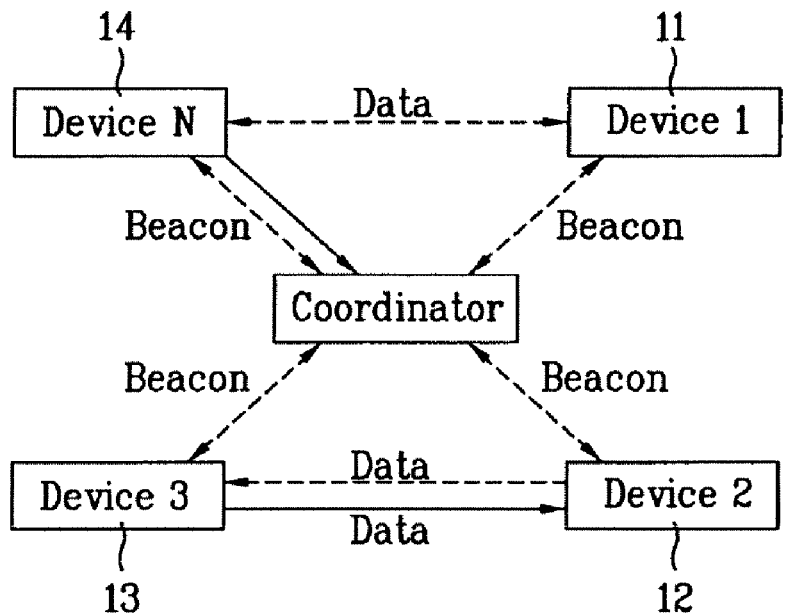
FIG. 1 is a diagram of an example of WVAN including a plurality of devices.

Additional features and advantages of the invention will be set forth in the description which follows, and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, An aspect of the present invention is in a coordinator in a wireless network including the coordinator and at least one or more devices, a method of performing communication, comprising transmitting a handover request message to a device having a highest priority for a coordinating function among the at least one or more devices, transmitting coordinator relevant information to the device, receiving a response message including information indicating that the handover is accepted in response to the handover request message and broadcasting a beacon including information indicating that the device becomes a new coordinator.

In transmitting the handover request message to the device, if the device is newly associated in the network, the coordinator received information on the priority of the and the priority of the device is higher than that of the coordinator; the handover request message may be transmitted to the device.

The coordinator relevant information may include at least one of current requests from the devices for CTBs, information about devices that are currently associated in the network including device capabilities, device IDs and power save statuses of the devices, and information on the priority of each of the at least one or more devices.

The beacon may include at least one of information on the new coordinator and information on a remaining time until the coordinating function of the coordinator is terminated.

And the method may further comprise receiving a first beacon broadcasted by the device after a last beacons broadcasted by the coordinator.

And the method may further comprise rejecting a request message transmitted by another device associated in the network between a timing point at which the coordinator transmits a last beacon and another timing point at which the device transmits a first beacon.

Another aspect of the present invention is method of performing communication in a wireless network, which includes a coordinator, the method comprising receiving information on a priority of a device associated in the network, transmitting a handover request message including coordinator relevant information to the device if the priority of the device is higher than that of the coordinator, receiving a response message including information indicating that the handover is accepted in response to the handover request message and broadcasting a beacon including information indicating that the device becomes a new coordinator.

The priority may be decided according to a prescribed evaluation reference that includes a device feature of the device and a network situation by at least one of the device and the coordinator.

The coordinator relevant information may include at least one of current requests from the devices for CTBs, information about devices that are currently associated in the network including device capabilities, device IDs and power save statuses of the devices, and information on the priority of each of the at least one or more devices.

The method may further comprise receiving a first beacon broadcasted by the device after a last beacon broadcasted by the coordinator.

Another aspect of the present invention is in a coordinator in a wireless network including the coordinator and at least one or more devices, a method of performing communication, comprising transmitting a first handover request message including coordinator relevant information to a first device having a highest priority among the at least one or more devices, receiving a response message including information indicating a handover rejection in response to the first handover request message and transmitting a second handover request message to a second device having a second highest priority among the at least one or more devices.

Another aspect of the present invention is in a coordinator in a wireless network including the coordinator and at least one or more devices, a method of performing communication, comprising transmitting a first handover request message including coordinator relevant information to a first device having a highest priority among the at least one or more devices and if a response message in response to the first handover request message is not received for a predetermined time, transmitting a second handover request message to a second device having a second highest priority among the at least one or more devices.

Another aspect of the present invention is in a coordinator in a wireless network including the coordinator and at least one or more devices, a method of performing communication, comprising selecting a device having a highest priority as a secondary coordinator among the at least one or more devices associated in the wireless network, transmitting a message announcing that the device having the highest priority is specified as the secondary coordinator and transmitting coordinator relevant information to the secondary coordinator, wherein the device selected as the secondary coordinator operates as a new coordinator in the wireless network in case of failing to receive a beacon from the coordinator at a beacon reception estimated timing point.

A device feature for deciding the priority may include at least one of a number of other devices accessible by the device, a time for maintaining a power of the device, and a transmission power of the device.

Another aspect of the present invention is in specific device of a wireless network including a coordinator and at least one or more devices, a method of performing communication, comprising receiving a backup message instructing to be selected as a secondary coordinator from the coordinator and in case of failing to receive a beacon from the coordinator at a beacon reception estimated timing point, transmitting a beacon to the wireless network.

After receiving the backup message, the method may further comprise receiving a beacon including coordinator relevant information from the coordinator and storing the coordinator relevant information.

The specific device may be decided through a priority for a coordinating function.

A device feature for deciding the priority may include at least one of a number of other devices accessible by the device, a time for maintaining a power of the device, and a transmission power of the device.

A beacon broadcasted by the specific device may include information on a new coordinator.

Another aspect of the present invention is in specific device of a wireless network including a coordinator and at least one or more devices, a method of performing communication, comprising receiving a backup message instructing to be selected as a secondary coordinator from the coordinator, in case of failing to receive a beacon from the coordinator at a beacon reception estimated timing point, transmitting a confirm message for confirming whether the coordinator can maintain a coordinating function to the coordinator and in case of failing to receive a message in response to the confirm message for a prescribed time, broadcasting a beacon to the wireless network.

The prescribed time may be a random access time block (RATB).

Another aspect of the present invention is in a wireless network including a coordinator and at least one or more devices, a method of performing communication, comprising receiving a priority list for a coordinating function from the coordinator and broadcasting a beacon to the network at a next beacon transmission timing by a device having a highest priority on the priority list if the device is not received a beacon from the coordinator within a prescribed time.

The broadcasted beacon may include information indicating the device is a new coordinator.

It is to be understood that both the foregoing general description and the following detailed description are exemplary and explanatory and are intended to provide further explanation of the invention as claimed.

Mode for the Invention

Reference will now be made in detail to the preferred embodiments of the present invention, examples of which are illustrated in the accompanying drawings.

Embodiments in the following description relate to examples that the technical features of the present invention are applied to WVAN (wireless video area network) as a sort of wireless network. The WVAN is a wireless network capable of providing throughput over 4.5 Gbps to transport 1080 p A/V stream within a short range of 10 meters without compression using a frequency band of 60 GHz.

FIG. 1 shows an example of WVAN including a plurality of devices.

The WVAN is a network configured for data exchange between devices located in a predetermined space. The WVAN includes at least two or more devices 10 to 14. And, one of the devices operates as a coordinator 10. In configuring a wireless network between the devices, a plurality of the devices should share radio resources with each other. To enable the devices to share the radio resources without collision, the coordinator 10 performs allocating and scheduling the radio resources.

The coordinator is provided with a function of allocating resources to enable the devices configuring the network to perform communication. The coordinator is also a normal device capable of transmitting and receiving data via at least one channel. Moreover, the coordinator is able to perform such a function as clock synchronization, network association, maintaining bandwidth resource, and the like as well.

The WVAN supports two kinds of physical layers (PHY). In particular, the WVAN supports HRP (high-rate physical layer) and LRP (low-rate physical layer). The HRP is the physical layer capable of supporting a data rate over 1 Gb/s, and the LRP is the physical layer capable of supporting a data rate of several Mb/s. The HRP is highly directional and is used for transmissions of isochronous data stream, asynchronous data, MAC command and ANV data via unicast connection. And, the LRP supports directivity or an omni-directional mode and is used for transmissions of beacon, asynchronous data, MAC command including beacon, and the like via unicast or broadcast. HRP channel and LRP channel share frequency band with each other and are discriminated in use from each other by TDM.

An example of a super frame structure used for the above-explained WVAN is explained as follows.

First of all, each super frame includes an area for transmitting beacon, a reserved channel time block, and an unreserved channel time block. The beacon is periodically transmitted to identify an introduction part of each super frame. The beacon packet includes scheduled timing information and management and control information on the WVAN. The device is capable of data exchange on the network through the timing information, the management/control information and the like included in the beacon. And, contention-based control period (CBCP) located next to the beacon is included to transmit an urgent control/management message. The contention-based control period can be named random access time block (RATB). A period length of the RATB is set to a predetermined threshold (mMAXCBCPLen) not to exceed.

Figure 2:
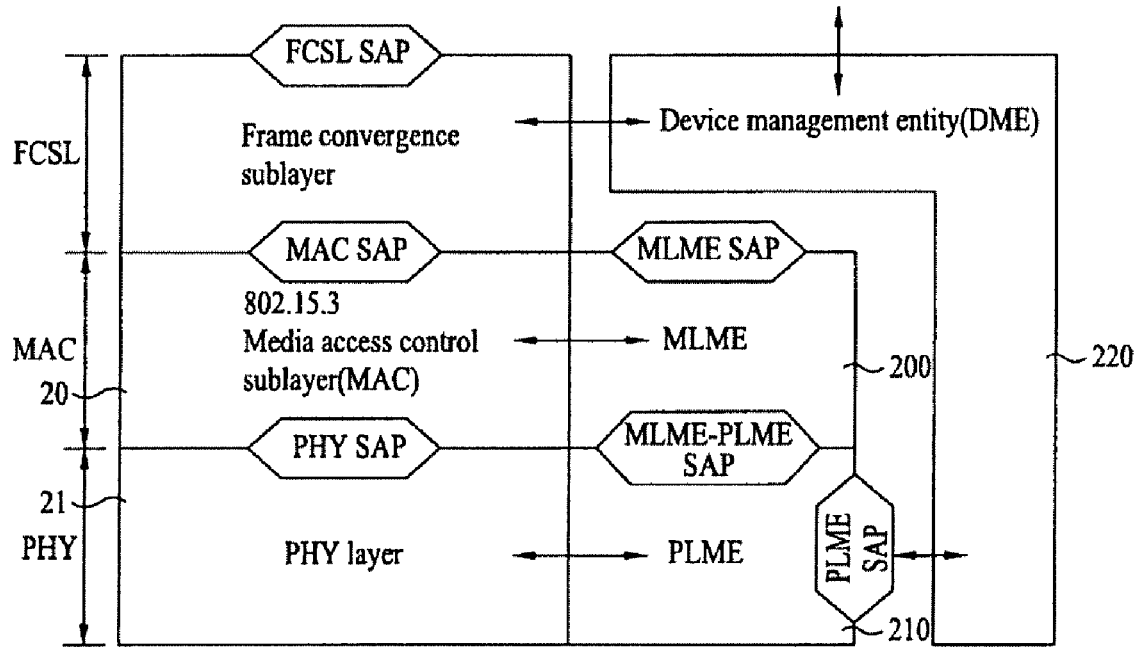
FIG. 2 is a diagram for a hierarchical protocol structure implemented in device of WVAN.

FIG. 2 is a diagram for a hierarchical protocol structure implemented in device of WVAN.

Referring to FIG. 2, each device included in WVAN can be divided into at least two layers according to its function and generally includes a PHY layer 21 and a MAC layer 20.

The device includes entities managing the layers, respectively. The entity managing the MAC layer is called MLME (MAC layer management entity) 200. And, the entity managing the PHY layer is called PLME (PHY layer management entity) 210.

And, the device includes a device management entity (DME) 220 that collects status information on each device and plays a role as a control path (interface) between a host and a wireless device. A message exchanged between layers different from each other is called a primitive.

The WVAN is initiated when a coordinator broadcasts a beacon. The device can perform communication in a manner that a channel time block for data exchange is allocated through an association procedure with the coordinator.

A method of performing communication for handover according to one embodiment of the present invention is explained as follows.

Figure 3:
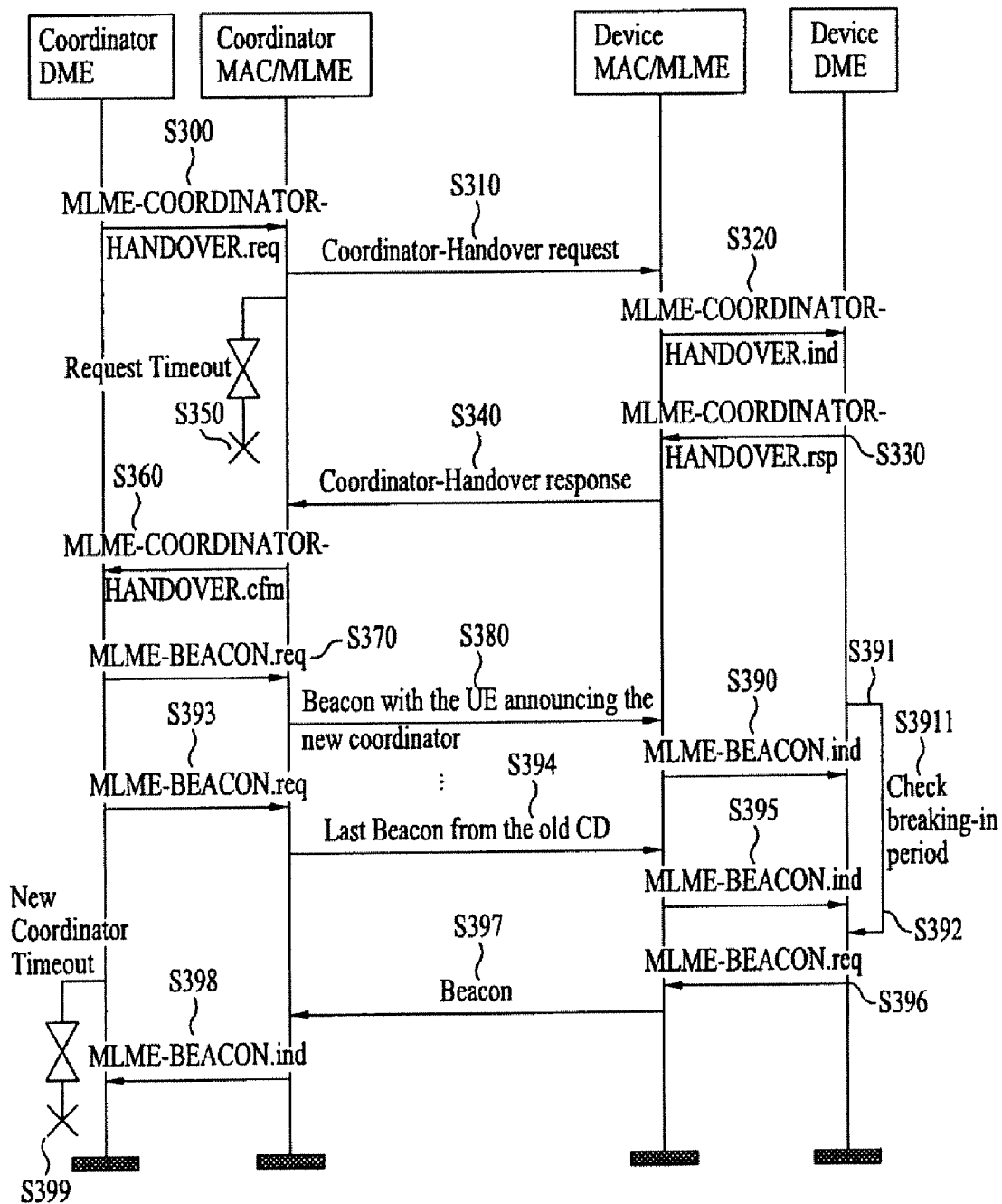
FIG. 3 is a flowchart of a process according to one preferred embodiment of the present invention.

FIG. 3 is a flowchart of a process according to one preferred embodiment of the present invention.

As a random device broadcasts a beacon, a network is established. And, the random device becomes a coordinator in the network.

If the coordinator moves away from the network or a power is cut off, the coordinator is unable to perform a coordinating function any more. If so, handover is executed. The coordinator selects another device that configures the network. In this case, the selected device should be able to perform a coordinating function at least.

In selecting one from devices configuring the network to make a handover request thereto, a priority is given to each of the devices to select a device in a better environment. In particular, the coordinator receives information on priorities for coordinating functions of the devices included in the network and then selects a device in an optimal condition to play a role as a new coordinator in performing handover using the priority information for the coordinating functions. The priority on the coordinating function is decided in a manner of determining evaluation references for time, place and the like and then considering device characteristics for the evaluation references.

In particular, each of the devices is able to decide a priority number for its coordinating function by considering such a fact as a long-life time feature, a power remaining quantity, a battery or an AC power, a network-coverage feature (which indicates how many devices capable of transmitting control messages and the like), and the like.

The coordinator receives the priority information (number) on the coordinating function of each of the devices and then configures and stores a list. In this case, the list configured through the priority information on the coordinating function can be called CCD (coordinator capable device) list.

Preferably, in transmitting a handover request message, the coordinator transmits a request message to the aforesaid device having the highest priority rather than transmits a request message to a random device. In particular, if the handover request message is preferentially transmitted to the device having the highest priority in accordance with the priority for the coordinating function, an optimal device can perform the coordinating function within an available range.

The DME of the coordinator transmits a MLME-COORDINATOR-HANDOVER.req primitive to the MLME to make a request for handover to the selected device (S300). The MLME of the coordinator transmits a handover request message (Coordinator-Handover request) to MLME of the selected device (S310).

Having transmitted the handover request message, the coordinator is able to transmit handover relevant information (information required for handover) and/or coordinator relevant information (information required for coordinating function execution).

For instance, information on a channel time currently reserved on a network, current requests from devices for CTBs, information on a remaining time until a current coordinator hands over a coordinating function (e.g., a count of remaining beacons, a count of beacon intervals, etc.), information on options (features) of devices configuring a current network (information about devices that are currently associated in the WVAN, e.g., capabilities, device ID, power save statuses of devices, etc.), information on a coordinating function priority of each device, and the like may be transmitted to the selected device together with the handover request message to be used for the device to decide whether to perform the handover. Besides, any information necessary for the handover can be transmitted together with the message for requesting the handover as well as the above-explained information.

In case that no request is made by a device, if information needed to execute handover is transmitted together with the handover request message, a size of packets (data) to be transported can be reduced. And, a corresponding procedure can be simplified as well. An example of MAC command format included in the handover request message is proposed by Table 1.

TABLE 1

| Octets: 1 | 1 | 1 | 1 | variable | Variable | Variable |
|---|---|---|---|---|---|---|
| command ID (ex. 0x0E) | length | Breaking-in period | Time-out | IE (Reserved schedule) | IE (Device list) | IE (CCD list) |

Through the Breaking-in period field shown in Table 1, it is able to know information on a time remaining until the device having received the handover request message initiates an operation by working as a new coordinator.

Through the timeout field, it is able to know information on a schedule time at which the device having received the handover request message should transmit a handover response message in response to the handover request message.

Through the reserved schedule filed shown in Table 1, it is able to know information on the reserved channel time.

Through the device list field, it is able to know information on devices configuring the network.

Through the CCD list field, it is able to know priority information on a coordinating function.

Meanwhile, MLME of the device having received the handover request message transmits a MLME-COORDINA- TOR-HANDOVER.ind primitive to DME to acknowledge that the request message has been received (S320).

The selected device decides whether to perform the coordinating function and then transmits a handover response message in response to the handover request message. In particular, the DME of the selected device transmits a MIME-COORDINATOR-HANDOVER.rsp primitive to the MLME (S330).

The MLME of the selected device transmits the handover response message (Coordinator-Handover response) to the MLME of the coordinator (S340). An example of format of MAC command included in the handover response message is proposed by Table 2.

TABLE 2

| Octets: 1 | 1 |
|---|---|
| command ID (ex. 0X0E) | Reason code (ex. 0x00: success, 0x01~0xFE: failure) |

The command format for the handover response message shown in Table 2 includes the reason code field. In this case, the reason code represents information that indicates acceptance or rejection to become a new coordinator. And, the coordinator is able to know success or failure of the handover request message using the reason code.

After the handover request message has been transmitted, it is preferable that the handover response message corresponding to the handover request message is received within a predetermined time. So, after the handover request message has been transmitted, the coordinator activates a timer set to the predetermined time. If a response message is received before completion of the timer, the coordinator deactivates the timer (S350).

The coordinator transmits a handover request message including information on the predetermined time to enable a device having received the handover request message to transmit a handover response message within the predetermined time (cf. Table 1). Yet, if the response message is not received until the timer is completed, the handover request fails. And, the handover request message will be transmitted to another device configuring the network.

The MLME of the coordinator sends a MLME-COORDINATOR-HANDOVER.cfm primitive to the DME to indicate that the handover response message has been received (S360).

The DME of the coordinator sends a MLME-BEACON-.req primitive for beacon transmission to the MLME (S370).

The MLME of the coordinator broadcasts a beacon to the network (S380). If the handover request is successful, the coordinator transmits information on a new coordinator, a CCD list, performance of devices configuring a current network and the like in case of transmitting a next beacon.

An example of information element (IE) format for the information transmitted by being included in the beacon is explained as follows. Information indicating which E will be used in accordance with a configuration of the MAC command or beacon can be included and transmitted. And, a message is transmitted by the defined IE format. Examples of IE format indicating the information on the priority number (CCD list), IE format indicating information on capability of device configuring a current network (device capability list), and IE format indicating information for a device decided as a new coordinator (new coordinator information) are explained with reference to the following table.

Table 3 shows an example of EE format indicating information on priority number (prioritized CCD list).

TABLE 3

| Octets: 1 | 1 | 2 | 2 |
|---|---|---|---|
| IE index | IE length = n*2 | CCD list block | CCD list block |

The IE format indicating the prioritized CCD list includes information (IE length) on a length of the IE format. If the count of devices (coordinator capable device: CCD) capable of performing the coordinating function is n, the length can become n*2 octets.

An exemplary configuration of the CCD list block field is shown in detail in Table 4.

TABLE 4

| 1 | 1 |
|---|---|
| CCD ID | Priority Val |

Referring to Table 4, the CCD list block field includes identification information of each CCD (CCD ID) and a CCD list block including information on a priority number.

Table 5 shows an example of the IE format indicating information on capability of device configuring a current network (Device Capability list).

TABLE 5

| Octets: 1 | 1 | 3 | 3 |
|---|---|---|---|
| IE index | IE length = n*3 | MAC capability Block 1 | MAC capability Block 1 |

In the IE format shown in Table 5, information indicating a length of the IE format (IE length) is included as well. If the count of devices (coordinator capable device: CCD) capable of performing the coordinating function is n, the length can become n*3 octets.

An exemplary configuration of the MAC Capability Block field is shown in detail in Table 6.

TABLE 6

| Octets: 1 | 2 |
|---|---|
| Device ID | MAC Capability Bitmap |

Referring to Table 6, the MAC Capability Block field includes device identification information (device ID) for each device configuring a network and MAC Capability Bitmap including information on device capability.

An exemplary configuration of the MAC Capability Bitmap is explained in detail with reference to Table 7 as follows.

TABLE 7

| Bits: 1 | 1 | 1 | 1 | 12 |
|---|---|---|---|---|
| Reserved | Fast Link Recommendation | HRP TX | HRP RX | Reserved |

Referring to Table 7, the MAC Capability Bitmap allocates 1 bit to each of information on a channel time reservation and information for fast link (Fast Link Recommendation). And, 1 bit is allocated to indicate a transmitting/receiving side of HRP (high rate PHY) channel communication.

Table 8 shows an example of IE format indicating information on a device decided as a new coordinator (New Coordinator Information).

TABLE 8

| Octets: 1 | 1 | 1 | 1 |
|---|---|---|---|
| IE index | IE length = 2 | New coordinator ID | Remaining breaking-in period |

The IE format can include information indicating a length of the IE format (IE length), identification information on a device decided as a new coordinator (New coordinator ID), and information on a remaining time until a current coordinator transmits a last beacon (e.g., remaining breaking-in period).

In order to announce when the device decided as the new coordinator can perform the coordinating function, the beacon can be transmitted in a manner of including information on a remaining time until a current coordinator transmits a last beacon. In this case, the remaining breaking-in period field can be used.

If the breaking-in period, which remains until the coordinator terminates the coordinating function after receiving the handover response message, is n, a beacon including information of breaking-in period=n is transmitted. A next beacon including information of breaking-in period=n−1 is then transmitted. A last beacon includes information of breaking-in period=0. The new coordinator having received the information transmits a first beacon from a next beacon transmission timing.

The informations are included in the beacon to be transmitted by the current coordinator using the above-explained IE format. The beacon is then transmitted. An example of a beacon message format including the informations is proposed by Table 9.

TABLE 9

| 1 | 1 | variable | variable | variable | 4 |
|---|---|---|---|---|---|
| Beacon Control | CBCP end time | IE 1 | IE m | IE n | CRC |

Referring to Table 9, the beacon message includes beacon control information and information on a CBCP end timing point and also includes IE format information for the information necessary for the rest of the fields. So, the beacon message is able to transmit the necessary informations.

For instance, IE proposed by Table 8 is inserted in the IE 1 field to transmit information on a device decided as a new coordinator (New Coordinator Information). The IE proposed by Table 3 is inserted in the EE m field to transmit information indicating a priority number (Prioritized CCD list). And, the IE proposed by Table 5 is inserted in the IE n field to transmit information on capability of device configuring a current network (Device Capability list).

To inform that the beacon has been received, the MLME of the device having received the beacon sends a MLME-BEACON.ind primitive to the DME (S390, S395).

Having received the last beacon transmitted by the current coordinator, the DME of the new coordinator sends a MLME-BEACON.req primitive to the MLME to transmit a beacon for a next beacon transmitting interval (S396).

The MLME of the new coordinator broadcasts a beacon to the network (S397).

The current coordinator having received the beacon sends a MLME-BEACON.ind primitive to the DME to inform that the beacon has been received (S398).

For stable handover, the current coordinator transmits the last beacon and then remains on the network for a predetermined time to check whether a beacon transmitted by a new coordinator is received. Preferably, the beacon transmitted by the new coordinator is received within a predetermined time after the last beacon has been transmitted.

So, after a timer set to a predetermined time is activated after completion of the last beacon, if a beacon message is received before completion of the timer, the coordinator deactivated the time and then terminates a coordinator role (S399). Yet, if the beacon message is not received until the timer is completed, the handover process fails. So, a handover request message is transmitted to another device configuring the network to re-execute the handover process.

Even if the handover request or the handover process fails, it is preferable that another device is selected using the information on the priority. More preferably, a handover request message is transmitted to a device having a priority higher than the former priority.

Preferably, for a time from a timing point of receiving a handover approve response message to a timing point of transmitting a last beacon, the current coordinator rejects request messages (e.g., channel time assign request message, association request message, etc.) transmitted by other devices.

A recovery or implicit handover method, which maintains and recovers a control function in a network if the control function is suddenly terminated, according to another embodiment of the present invention is explained as follows.

For example of the recovery method, there is a method including the steps of deciding a new control device before execution of a recovery process and then enabling the new control device to perform recovery. In the following description, a device decided as the new control device is named a secondary controller or a secondary coordinator (SCD).

In case that the secondary coordinator recognizes that a control function is abnormal, it transmits a request message to confirm whether an old control device keeps operating or a function of the old control device is terminated. If a response message is not received from the old control device after completion of prescribed duration, the secondary coordinator plays a role as a new control device in a network in performing a control function.

Figure 4:
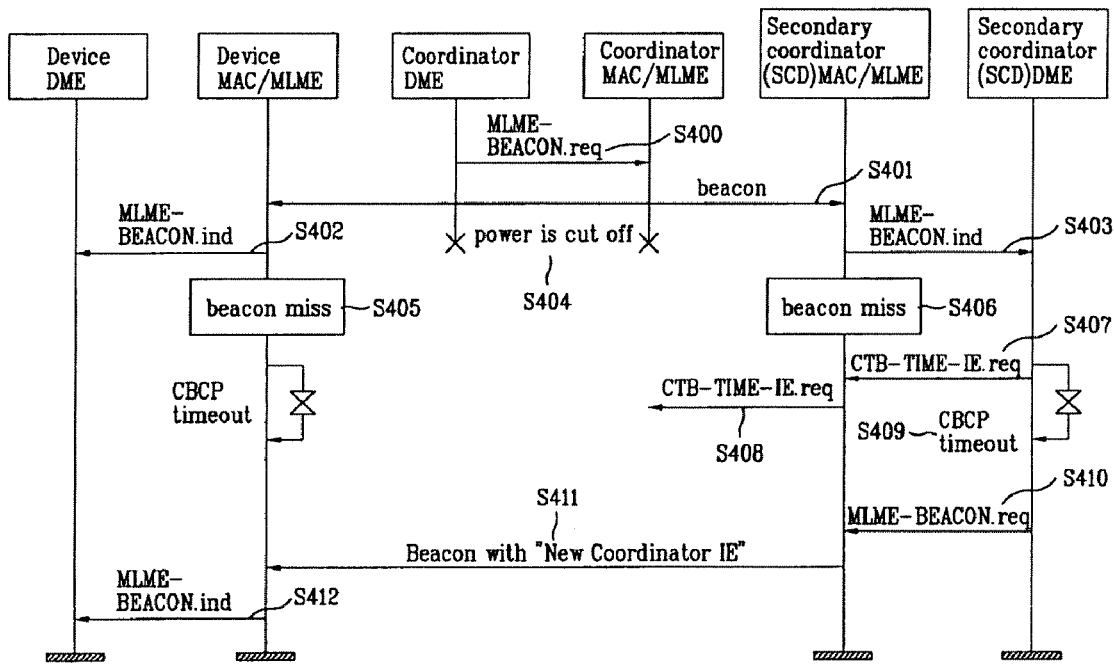
FIG. 4 is a flowchart of a process according to another preferred embodiment of the present invention.

FIG. 4 is a flowchart of a process according to another preferred embodiment of the present invention. WVAN, as shown in FIG. 1, includes a plurality of devices 10 to 14. And, one of a plurality of the devices operates as a coordinator 10. For clarity of explanation, FIG. 4 shows devices in part.

Referring to FIG. 4, a DME of the coordinator sends a MLME-BEACON.req primitive for requesting a beacon transmission to an MLME (S400).

The MLME of the coordinator transmits a beacon to MLME of devices configuring EVAN (S401).

An MLME of each of the devices having received the beacon sends a MLME-BEACON.ind primitive announcing that the beacon has been received to a DME of each of the devices (S402, S403).

The devices configuring the WVAN are able to perform data exchanges with each other via scheduling information of the beacon.

If a power of the coordinator is cut off (S404) or if the coordinator moves away from an area of the WVAN, it is impossible to perform a beacon broadcast any more. If so, the devices within the WVAN are unable to receive the beacon at a scheduled timing (S405, S406). Thus, the case that a scheduled beacon is not received is named a case that a beacon is missed.

To prepare for a case that the coordinator is unable to perform a coordinating function suddenly in WVAN communication, a secondary coordinator (SCD) is decided in advance.

If a device decided as the secondary coordinator (hereinafter called secondary coordinator) is unable to receive the beacon (S406), a DME of the secondary coordinator sends a CTB-TIME-IE.req primitive, which requests to transmit a confirmation request message to a current coordinator, to a MLME (S407).

The MLME of the secondary coordinator transmits the confirmation request message (CTB-TIME-IE req) to the MLME of the current coordinator according to the primitive (S408).

Namely, if the beacon is not received from the current coordinator, the secondary coordinator transmits the confirmation request message. If a response message in response to the request message is not received, the secondary coordinator can decide that the corresponding coordinating function is not executed.

It takes a prescribed time until it is decided whether a response to the confirmation request message is received (S409). If the response message is not transmitted from the current coordinator for the prescribed time, the secondary coordinator starts to operate as a new coordinator of the WVAN.

The DME of the secondary coordinator operating as a new coordinator sends a MLME-BEACON.req primitive for a transmission of a beacon at a next beacon transmission timing (S410).

The MLME of the secondary coordinator broadcasts a beacon on a network (S411). In this case, a first transmitted beacon is configured to include information on a new coordinator and then transmitted (S411).

Each MLME of the devices receives the broadcasted beacon and then sends a MLME-BEACON.ind primitive, which announces the beacon is received, to the corresponding DME of each of the devices (S412).

One embodiment of a time reference for transmitting the confirmation request message and awaiting the response message is explained in detail as follows. A prescribed timer function is available. In particular, a waiting time is set, the timer is activated before or after transmission of the confirmation request message, the timer is then terminated after elapse of the time.

Preferably, the coordinator is able to use the structure of the super frame for timing control information on the channel time resource. If the secondary coordinator fails to receive the beacon for a timing that the beacon should be transmitted, a timing information request message is transmitted to the coordinator for RATB to make a request for timing information that could be provided by the beacon that is not received. In the recovery process, the confirmation request message (CTB-TIME-IE req) is transmitted using the RATB. If the secondary coordinator fails to receive the beacon at the timing of transmitting the beacon, the confirmation request message (CTB-TIME-IE req) is transmitted for the RATB (S408).

Figure 5:
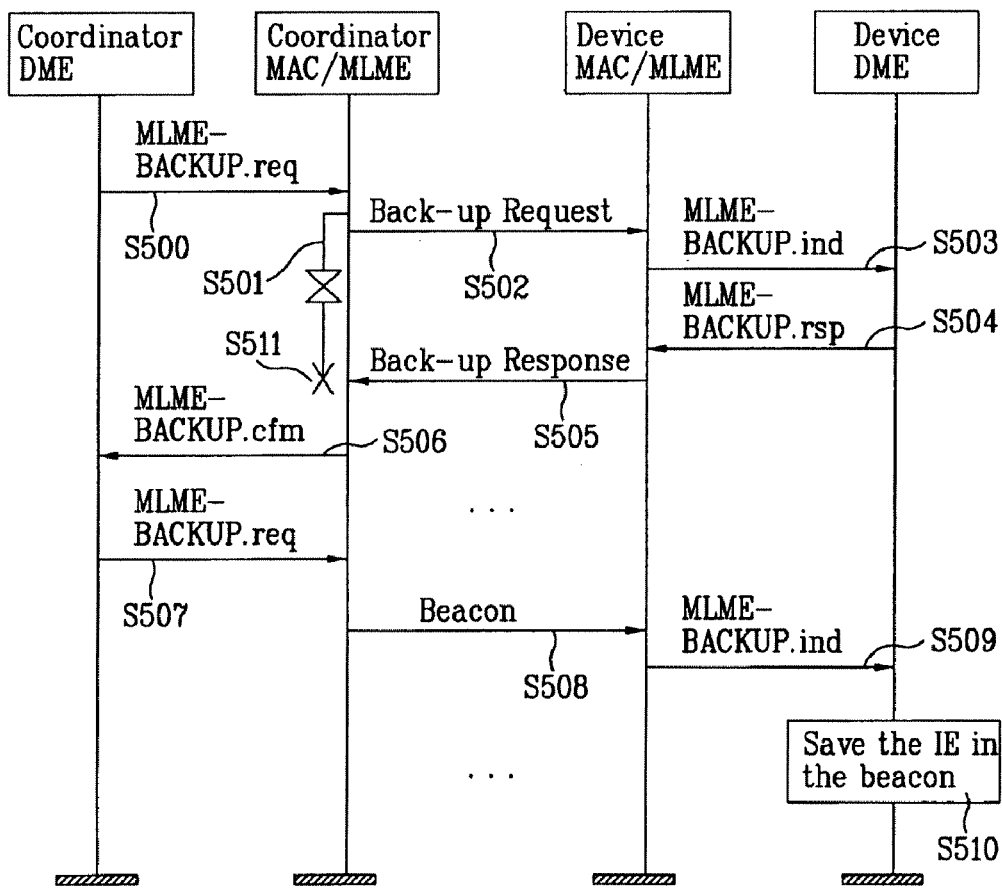
FIG. 5 is a flowchart of one example for a substitute coordinator deciding method according to another preferred embodiment of the present invention.

FIG. 5 is a flowchart of one example for a substitute coordinator deciding method according to another preferred embodiment of the present invention.

An example that a current coordinator decides a secondary coordinator prior to a recovery process is explained with reference to FIG. 5. The secondary coordinator deciding step prior to the recovery process can be an example of a pre-handover process.

First of all, a coordinator selects a random device from a plurality of devices configuring WVAN. In this case, the selected device should be able to perform a coordinating function at least. A DME of the coordinator sends a MLME-BACKUP.req primitive to a MLME to make a backup request (S500).

The MLME of the coordinator transmits a backup request message to a MLME of the selected device (S502). The backup request message is a message that makes a request for the coordinator to select a random device as a secondary coordinator for performing a recovery in the future. A format of MAC command usable in transmitting the backup request message is proposed by Table 10.

TABLE 10

| Octets: 1 | 1 | variable |
|---|---|---|
| Command ID (ex. 0x10) | length | IE (device list) |

A command format for a backup request message shown in Table 10 includes a filed for a device list. In this case, the device list is an information list about devices configuring a current network. By including the device list in the backup request message and then transmitting the message, it is able to use the included device list in deciding whether the selected device is going to become a secondary coordinator.

Since a response message in response to the backup request message is preferably received within a predetermined time, it is able to an elapse of the predetermined time via a timer. In particular, a timer set to the predetermined time is activated before the backup request message is transmitted (S501). And, it is also able to activate the timer when the request message is transmitted or after the request message has been transmitted.

The activated timer completes its operation if the set time is up. So, it is able to know whether the predetermined time goes by. Alternatively, the coordinator transmits a backup request message including information on the predetermined time. So, the coordinator enables a device having received the backup request message to transmit a backup response message within the predetermined time.

Before the timer expires, i.e., before the predetermined time goes by, a DME of the device having received the backup request message sends a MLME-BACKUP.rsp primitive for a backup message transmission to a MLME (S504).

The MLME of the device transmits a backup response message to the MLME of the coordinator (S505). A format of MAC command usable in transmitting the backup response message is proposed by Table 11.

TABLE 11

| Octets: 1 | 1 |
|---|---|
| Command ID (ex. 0x11) | Reason code (ex. 0x00: success, 0x01 to 0xEF: failure) |

A command format for a backup response message shown in Table 11 includes a filed for a reason code. The reason code indicates a result for whether to accept to become a secondary coordinator for the backup request message. The coordinator is able to know success/failure of the backup request message using the reason code.

If the backup response message is received, the timer stops operating before its expiration (S511).

The MLME of the coordinator sends a MLME-BACKUP.cfm primitive to the DME to announce that the backup response message has been received (S506).

If the backup response message of success is transmitted, the device is decided as a secondary coordinator. The MLME of the coordinator transmits a beacon to a MLME of the device decided as the secondary coordinator (S508).

The device decided as the secondary coordinator stores information included in the transmitted beacon to perform a coordinating function as a new coordinator after completion of a recovery process (S510).

According to another embodiment, it will be more preferable to make a selection by deciding a priority for a coordinating function of device and considering the priority rather than by selecting a random device from a plurality of devices and then transmitting a backup request message. Each of the devices differs in a suitable degree as a coordinator in accordance with device characteristics and features.

So, a priority for a coordinating function can b set up through information for each device feature from the devices configuring the network. By enabling the coordinator to know the setup priority information or enabling the setup priority information to be shared by the devices configuring the network, it is able to more properly decide which one of the devices is more suitable for a coordinator.

According to a further embodiment, a coordinator receives priority information on the coordinating function from the devices and then configures a priority list for the coordinating function. The configured priority list for the coordinating function is transmitted to each device via an announcement message. Alternatively, the coordinator receives a message from requesting a list from each device and then transmits the priority list for the coordinating function via a response message in response to the message for requesting the list.

Each of the devices knowing the transmitted priority list for the coordinating function becomes a secondary coordinator by itself and then stores information necessary to perform the coordinating function, to prepare for an occurrence of a beacon miss. The device having become the secondary coordinator can inform the coordinator that it is decided as the secondary coordinator via an announcement message. If the secondary coordinator fails to receive a beacon from the coordinator, it operates as a new coordinator by transmitting a beacon by itself.

In deciding the priority, considerable features include a number of other accessible devices according to locations of the respective devices, a time for continuing a power, an outputted power, and the like.

Figure 6:
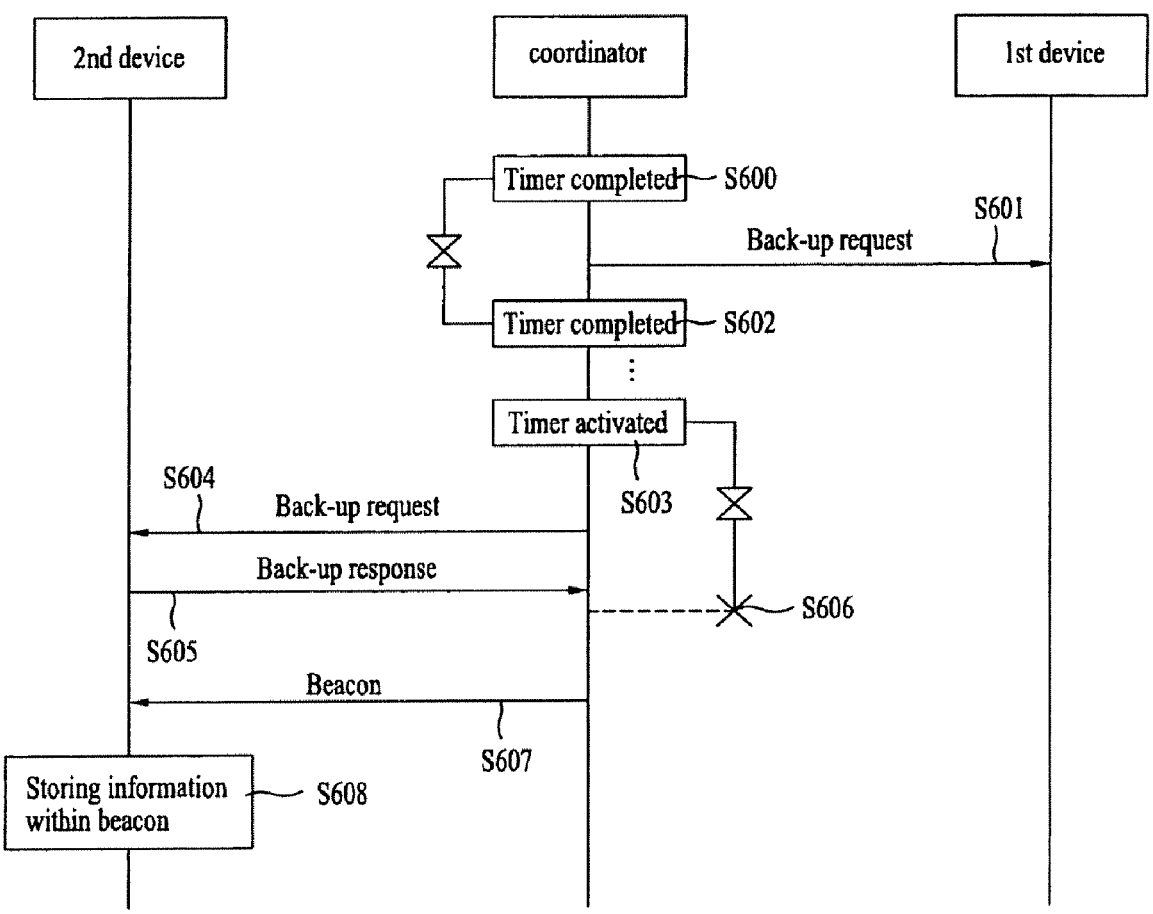
FIG. 6 is a flowchart of another example for a substitute coordinator deciding method according to another preferred embodiment of the present invention.

FIG. 6 is a flowchart of another example for a substitute coordinator deciding method according to another preferred embodiment of the present invention.

A selecting method proposed by FIG. 6 relates to a case that a backup response message of success is not transmitted in response to a backup request message transmitted by a coordinator. For clarity of explanation, FIG. 6 shows a MLME transmission message of device only without representing a layer structure of each device. Yet, it is apparent that a signal exchange between layer structures should exist.

Referring to FIG. 6, the coordinator transmits a backup request message (Back-up Request) to a random first device (S601).

A method of checking whether a backup response message is transmitted by the first device for a predetermined time is executed by the same method proposed by FIG. 4. In particular, a timer is activated before the backup request message is transmitted. After the predetermined time goes by, the timer expires (S600, S602).

The coordinator transmits a backup request message including information on the predetermined time and then enables a device having received the backup request message to transmit a backup response message within the predetermined time. If a backup response message is not received from the first device or if a backup response message of failure is received, a secondary coordinator deciding process for the first device fails.

The coordinator transmits a backup request message (Backup Request) to a second device again (S604). A deciding method for the second device can be carried out by the same method proposed by FIG. 4 (S603 to S608).

In this case, the above-explained priority information on the coordinating function between the devices is usable as well. In particular, after a backup request message has been preferentially transmitted to a device having a highest priority, if a backup response message is not transmitted or a backup response message of failure is transmitted, a backup request message (Backup request) is transmitted to another device having a second highest priority again. Thus, the secondary coordinator is selected by considering the priority for the coordinating function, whereby inter-network communication can be more efficiently carried out.

According to one embodiment of the present invention, communication can be smoothly carried out in a wireless network. Specifically, communication can be seamlessly carried out without being considerably affected by a situation of a specific device. A device performing a coordinating function is not limited to a specific device but can be flexibly changed according to a situation. Moreover, a new coordinator is selected by considering a priority for a coordinating function, whereby an optimal device can operate as a new coordinator.

According to another embodiment of the present invention, communication can be smoothly carried out in a wireless network. Specifically, communication can be seamlessly carried out without being considerably affected by a situation of a specific device. Moreover, it is able to select a more suitable device in deciding a secondary coordinator, whereby efficient communication is enabled.

Besides, the terminologies used in the above disclosure can be replaced by other terminologies. For instance, a device can be replaced by one of a user device (or apparatus), a station and the like. A coordinator can be replaced by one of a coordinating or control device, a coordinating or control device, a coordinating or control station, a coordinator, a PNC (pico net coordinator) and the like.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

INDUSTRIAL APPLICABILITY

Accordingly, the present invention is applicable to wireless communication. In particular, the present invention is applicable to a handover in a wireless network or communication execution for an implicit handover.

The invention claimed is:

1. A method of performing handover at a coordinator in a wireless network in which a high rate physical channel and a low rate physical channel are used for communication, the wireless network including at least one device, the method comprising:
   receiving information associated with a priority of a device from the device when the device joins the wireless network;
   transmitting a handover request message to the device if the priority of the device is higher than a priority of the coordinator based on the information received from the device;
   receiving a response to the handover request message from the device;
   broadcasting a first beacon on the low rate physical channel, the first beacon including identification information indicating that the device will be a new coordinator of the wireless network and number information indicating a number of beacons that the coordinator will broadcast before the handover occurs; and
   broadcasting one or more beacons, corresponding to the number indicated by the number information, on the low rate physical channel, each of the one or more beacons including updated number information indicating a number of remaining beacons that the coordinator will send before the handover occurs, wherein the updated number information included in a last beacon among the one or more beacons is set to "0."

2. The method of claim 1, wherein the priority of the device has been determined by at least the device or the coordinator based on characteristics of the device.

3. The method of claim 1, wherein the handover request message comprises handover-related information including at least information associated with reserved channel time blocks or information associated with characteristics of devices which comprise the wireless network.

4. The method of claim 1, further comprising receiving a second beacon broadcast by the device after broadcasting a last beacon among the number of beacons and the coordinator terminates its coordinating function.

5. The method of claim 1, wherein the response comprises information indicating that the device is ready to take over as the new coordinator of the wireless network.

6. The method of claim 1, wherein the number information is included in a field of an information element included in each of the one or more beacons.

7. A method of performing handover at a device in a wireless network in which a high rate physical channel and a low rate physical channel are used for communication, the wireless network including a coordinator and at least one device, the method comprising:
   transmitting information associated with a priority of the device to the coordinator when the device joins the wireless network;
   receiving a handover request message from the coordinator if the priority of the device is higher than a priority of the coordinator based on the information transmitted to the coordinator;
   transmitting a response to the handover request message to the coordinator;
   receiving a first beacon on the low rate physical channel, the first beacon including identification information indicating that the device will be a new coordinator of the wireless network and number information indicating a number of beacons that the coordinator will broadcast before the handover occurs; and
   receiving one or more beacons broadcast by the coordinator on the low rate physical channel, a number of the one or more beacons corresponding to the number of beacons indicated by the number information, each of the one or more beacons including updated number information indicating a number of remaining beacons that the coordinator will send before the handover occurs, wherein the updated number information included in a last beacon among the one or more beacons is set to "0."

8. The method of claim 7, wherein the handover request message comprises handover-related information including at least information associated with reserved channel time blocks or information associated with characteristics of devices which comprises the wireless network.

9. The method of claim 7, further comprising broadcasting a second beacon after receiving a last beacon among the number of beacons broadcast by the coordinator and the coordinator terminates its coordinating function.

10. The method of claim 7, wherein the response comprises information indicating that the device is ready to take over as the new coordinator of the wireless network.

11. The method of claim 7, wherein the number information is included in a field of an information element included in each of the one or more beacons.

12. A coordinator in a wireless network in which a high rate physical channel and a low rate physical channel are used for communication, the wireless network including at least one device, wherein the coordinator is configured to:
   receive information associated with a priority of a device from the device when the device joins the wireless network;
   transmit a handover request message to the device if the priority of the device is higher than a priority of the coordinator based on the information received from the device;
   receive a response to the handover request message from the device;
   broadcast a first beacon on the low rate physical channel, the first beacon including identification information indicating that the device will be a new coordinator of the wireless network and number information indicating a number of beacons that the coordinator will broadcast before the handover occurs; and
   broadcast one or more beacons, corresponding to the number indicated by the number information, on the low rate physical channel, each of the one or more beacons including updated number information indicating a number of remaining beacons that the coordinator will send before the handover occurs, wherein the updated number information included in a last beacon among the one or more beacons is set to "0."

13. A device in a wireless network in which a high rate physical channel and a low rate physical channel are used for communication, the wireless network including a coordinator and at least one device, wherein the device is configured to:
   transmit information associated with a priority of the device to the coordinator when the device joins the wireless network;
   receive a handover request message from the coordinator if the priority of the device is higher than a priority of the coordinator based on the information transmitted to the coordinator;
   transmit a response to the handover request message to the coordinator;
   receive a first beacon on the low rate physical channel, the first beacon including identification information indicating that the device will be a new coordinator of the wireless network and number information indicating a number of beacons that the coordinator will broadcast before the handover occurs; and receive one or more beacons broadcast by the coordinator on the low rate physical channel, a number of the one or more beacons corresponding to the number of beacons indicated by the number information, each of the one or more beacons including updated number information indicating a number of remaining beacons that the coordinator will send before the handover occurs, wherein the updated number information included in a last beacon among the one or more beacons is set to "0."

* * * * *